B. T. BABBITT.
Apparatus for Extinguishing Fires.
No. 134,024.            Patented Dec. 17, 1872.
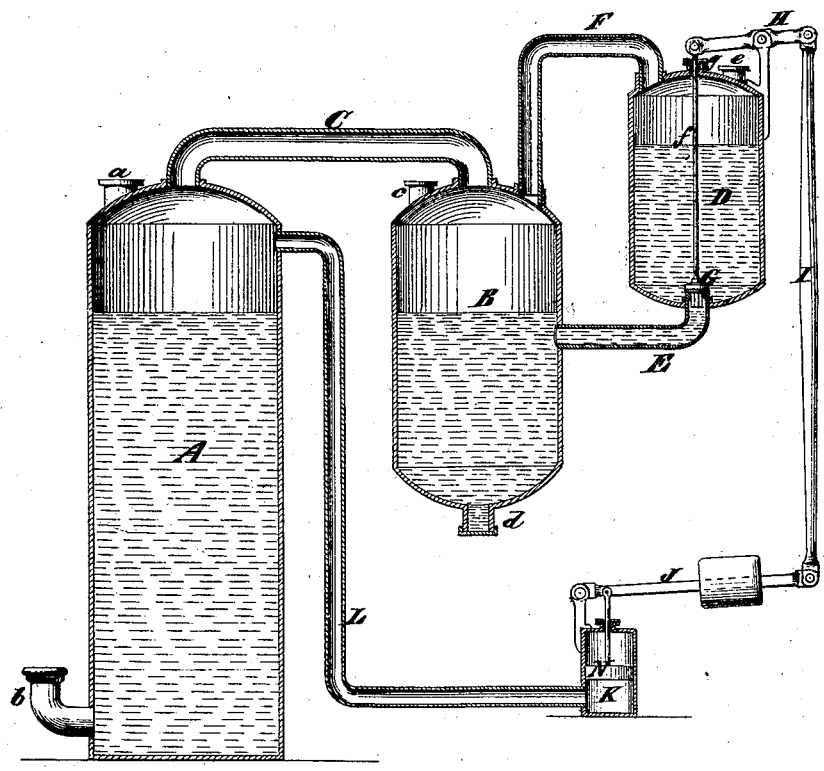

UNITED STATES PATENT OFFICE.

BENJAMIN T. BABBITT, OF NEW YORK, N. Y.

IMPROVEMENT IN APPARATUS FOR EXTINGUISHING FIRES.

Specification forming part of Letters Patent No. 134,024, dated December 17, 1872.

*To all whom it may concern:*

Be it known that I, BENJAMIN T. BABBITT, of the city, county, and State of New York, have invented an Improvement in Apparatus for Extinguishing Fires, of which the following is a specification:

This invention is chiefly designed for application to stationary fire-extinguishing apparatus permanently situated in houses and other buildings. It consists in the combination, with such an apparatus, composed essentially of a reservoir for salt-water, a vessel for containing an alkali, and another for containing acid, and suitable pipes for establishing a proper communication between the three, of a valve which controls the pipe connecting the acid-chamber with the one containing alkali, and a cylinder and piston, the latter of which is connected to a weighted lever also connected with the aforesaid valve, and the former of which is in communication with the water-reservoir before mentioned, whereby, upon the accumulation of a superabundant pressure in the water-reservoir, the supply of acid to the alkali-chamber is shut off, and upon a reduction of such pressure the supply of acid is again started, and so the operation of the apparatus is automatically regulated.

The accompanying drawing represents a central vertical section of an apparatus having my invention applied.

A is a large reservoir, which may be of any suitable form, and is permanently filled with salt-water or any other fire-extinguishing liquid. It is provided at the top with a filling-nozzle, *a*, and near the bottom with a discharge-nozzle, *b*, for the attachment of a hose.

B is the alkali-chamber. It is represented as being of cylindrical form, and is very much smaller than the reservoir just described. Like the latter, it is provided with a filling, mouth, *c*, and it is also furnished with a discharge-nozzle, *d*. This vessel is connected at the top with the top of the reservoir A by a pipe, C. The substance I purpose to use in it is carbonate of soda, either dry or in solution. D is another vessel also of cylindrical form. Like the other two, it is furnished with a filling-mouth, *e*, and it is connected at the bottom by a pipe, E, with the middle portion of the vessel B. It is also connected at the top with the top of the same vessel by a pipe, F, for the purpose of equalizing the pressure in both vessels to permit the contents of the former to flow into the latter. The end of the pipe E that is in the vessel D is fitted with a puppet-valve, G, which is furnished with a rod or stem, *f*, that extends through a stuffing-box, *g*, on the top of the vessel last named. This vessel is filled with strong sulphuric acid, and the valve G controls the escape of the latter to the vessel B. The stem of the valve G is connected to one end of a lever, H, which is pivoted to a fulcrum on the top of the vessel D, and connected at the other end by a rod, I, with the adjacent end of a weighted lever, J, which is pivoted at the other to a fulcrum provided on a cylinder, K. A pipe, L, connects the lower portion of this cylinder with the upper part of the water-reservoir A, and said cylinder is fitted with a piston, N, whose rod is connected with the lever J.

When the apparatus is not in use a prop is kept under the outer end of the lever J to keep the valve G shut. As soon as a fire breaks out the prop is knocked from under the lever, and the latter is then forced down by its weight and shifts the lever H, and so opens the valve G. The acid is thereby permitted to flow from its chamber into the alkali-chamber. Gas is generated thereby in the latter chamber, and, passing through the pipe C, enters the water-reservoir and discharges its contents through the nozzle *b*, and also enters the cylinder K and presses on the under side of its piston N. As soon as a certain pressure is accumulated in the reservoir and cylinder the piston is raised, and through it is also raised the lever J, and the valve G is thereby closed, and the supply of acid to the alkali-chamber is stopped. The generation of gas is thus arrested and an unnecessary waste is obviated. As soon as the pressure in the reservoir and cylinder is reduced the weighted lever again drops and opens the valve G, thereby re-establishing communication between the acid and alkali chambers, and the generation of gas recommences.

Thus the operation of the apparatus is automatically regulated so as to force the fire-extinguishing liquid constantly with the same pressure.

Claim.

The combination, with the reservoir A, vessels B and D, and their connecting-pipes, of the valve G and the cylinder and piston K N, substantially as and for the purpose herein set forth.

BENJAMIN T. BABBITT.

Witnesses:
 C. R. BECKWITH,
 J. M. KANE.